US012685983B2

(12) United States Patent
Jayaprakash et al.

(10) Patent No.: US 12,685,983 B2
(45) Date of Patent: Jul. 21, 2026

(54) BENEFIT AGENT DELIVERY SYSTEM

(71) Applicant: ITC Limited, Kolkata (IN)

(72) Inventors: Doss Jayaprakash, Bangalore (IN);
Deepa Unnikrishnan, Bangalore (IN);
Vijayan Padmanabhan, Bangalore
(IN); Avinash Arun Kumar, Bangalore
(IN)

(73) Assignee: ITC LIMITED, Kolkata (IN)

( * ) Notice: Subject to any disclaimer, the term of this
patent is extended or adjusted under 35
U.S.C. 154(b) by 593 days.

(21) Appl. No.: 18/036,923

(22) PCT Filed: Nov. 13, 2021

(86) PCT No.: PCT/IB2021/060531
§ 371 (c)(1),
(2) Date: May 15, 2023

(87) PCT Pub. No.: WO2022/101861
PCT Pub. Date: May 19, 2022

(65) Prior Publication Data
US 2024/0001321 A1 Jan. 4, 2024

(30) Foreign Application Priority Data
Nov. 13, 2020 (IN) .............................. 202031049704

(51) Int. Cl.
*B01J 13/08* (2006.01)
*A61Q 13/00* (2006.01)
*C11B 9/00* (2006.01)

(52) U.S. Cl.
CPC .............. *B01J 13/08* (2013.01); *A61Q 13/00*
(2013.01); *C11B 9/0034* (2013.01)

(58) Field of Classification Search
CPC .... A61Q 13/00; C11B 9/0034; C11D 7/5022;
C11D 7/265; C11D 7/261; C11D 7/266;
C11D 7/3209; C11D 3/50; C11D 3/776;
C11D 3/505; B01J 13/08
USPC ......................................................... 512/2, 1
See application file for complete search history.

(56) References Cited

U.S. PATENT DOCUMENTS 6,869,923 B1    3/2005  Cunningham et al.
10,272,025 B2 *  4/2019  Chevet ................. A61K 8/8182

FOREIGN PATENT DOCUMENTS

EP        0384034 A2    8/1990
EP        0965326 A1    12/1999
EP        3160433 A1    5/2017

OTHER PUBLICATIONS

PCT Search Report & Written Opinion dated Oct. 2, 2022; Application No. PCT/IB2021/060531.

* cited by examiner

*Primary Examiner* — Jessica Whiteley
(74) *Attorney, Agent, or Firm* — The Dobrusin Law Firm, P.C.

(57) ABSTRACT

The present invention relates to a delivery system which enables selective entrapment. The delivery system comprises a solvent system which is a hydro-alcoholic solvent system; 1.5-10% of at least one polymer; and 0.00025-0.75% of at least one enabler. It may optionally comprise one or more benefit agent.

19 Claims, 3 Drawing Sheets

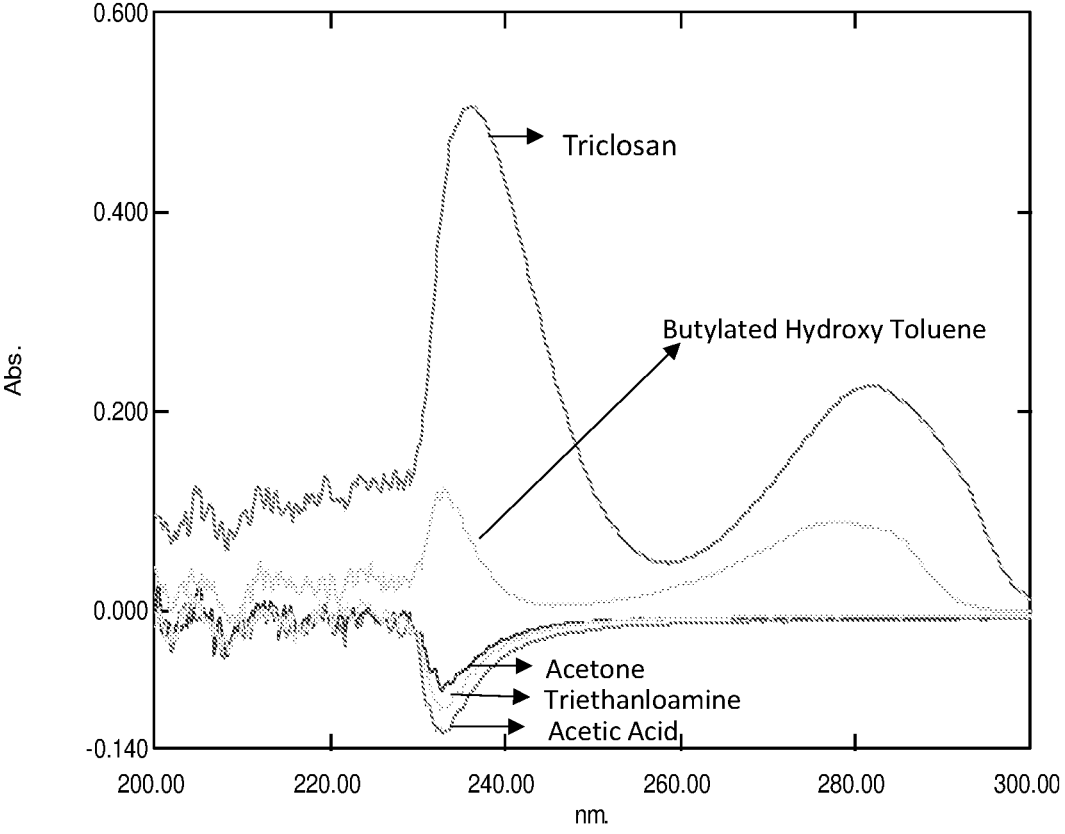
Figure 1. UV-Vis spectra of PVP with different enablers at lower concentrations

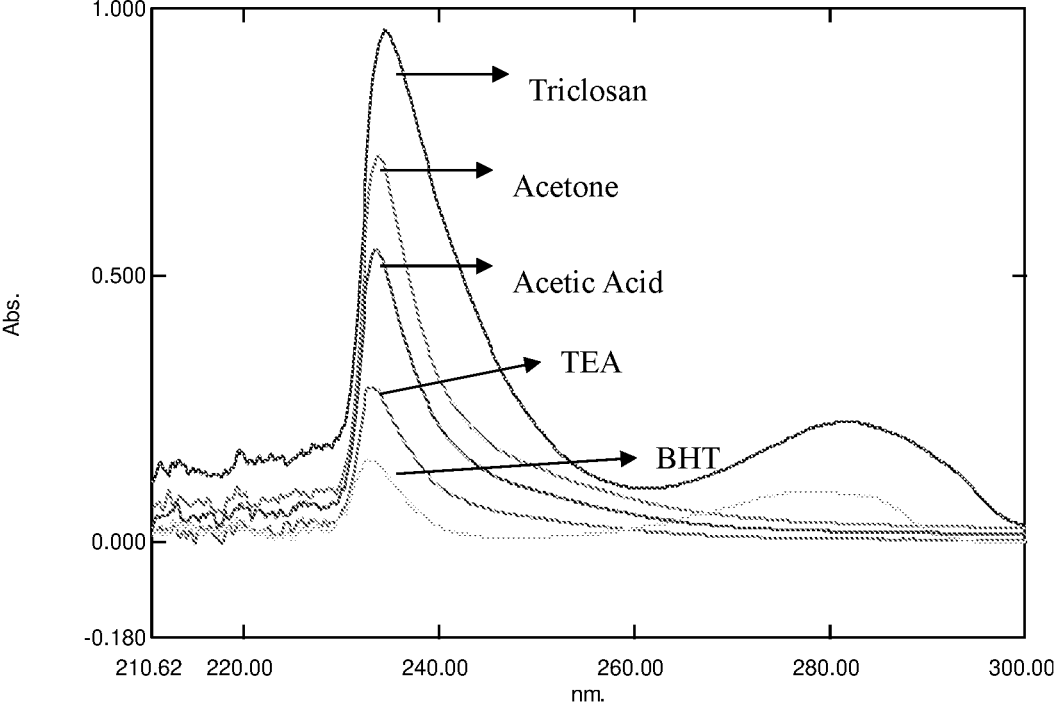
Figure 2. UV-Vis spectra of PVP with different enablers at 10 ppm

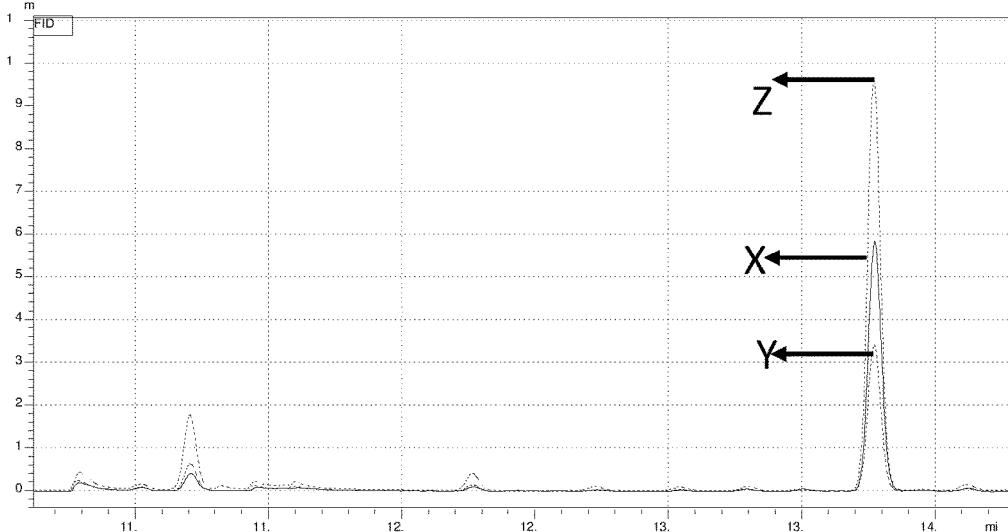
Figure 3 - GC HS chromatogram of fragrance components in the presence of BHT and the PVP with water activation

BENEFIT AGENT DELIVERY SYSTEM

FIELD OF THE INVENTION

The present invention provides a delivery system to entrap a benefit agent in an in situ folded polymer thereby improving its solubility in alcohol-water mixtures. In particular, the invention relates to a system that enables preferential entrapment of select benefit agent from amongst a combination of various inert and active agents present in a given composition. Even more particularly, the invention relates to selective and preferential entrapment of benefit agents present in a composition and their release in response to a stimulus such as sweat, heat or moisture.

BACKGROUND OF THE INVENTION

Encapsulation of small molecules into cavities formed by various structures provides several distinct advantages. Molecules inside these cavities are shielded from external forces and hence are stabilized. The cavities often enable the molecules to adopt different chemical structures that lead to improvement in their physical properties like solubility, the way they interact with light etc. In its simplest form of application, these isolated molecules can be selectively released, as in the case of drug molecules, for a lasting effect.

Various encapsulating solutions such as polymers, cyclodextrins, liposomes are available which encapsulate active molecules, pharmaceutical ingredients, anti-odorants and perfumes. However, such encapsulating solutions including cyclodextrins have lower solubility in water and require selective functionalization which leads to higher cost. More so, encapsulation and entrapment of active molecules typically add to final cost of the end product and hence it is a continuous endeavor of formulators world over to provide similar or more efficacious active entrapment systems comprising ingredients that are more cost effective, easy to use and processable at large scale. Though use of entrapped benefit agents in aqueous based systems is widely known, polymers conventionally used in such systems have not been used for entrapment in hydro-alcoholic systems.

While various means are available in the art to encapsulate active ingredients and molecules in aqueous systems, there is still an unmet need in the art to arrive at solutions which are effective, cost efficient, easily processable and are industrially compatible with a wide variety of product matrix such as alcoholic and hydro-alcoholic system. One such commonly used ingredient is a film former, commonly used in cosmetic industry and commercially sold by various vendors as polyvinyl pyrrolidone (PVP). Due to its film forming properties, PVP, enables uniform spread of given active and thereby improved delivery.

CA2008556A1 discloses a perfuming composition with deodorant or antiperspirant action for use in personal care, containing, in addition to an active deodorant or antiperspirant base, a perfuming base, either in the form of an aqueous emulsion, or in microencapsulated form, the said perfuming base being combined with a film-forming substrate and an emulsifying agent, said composition being characterized in that said film-forming substrate contains polyvinyl-pyrrolidone.

However, with changing times, the demands of the consumers have also been constantly evolving and a need is felt for a delivery system that is not only simplistic, effective also cost efficient, easily processable and industrially compatible to prepare at commercial scale but is capable of selectively entrapping and in providing a delayed release of the entrapped benefit agents molecules over time.

Object of the Invention

It is one of the object of the present invention to provide a delivery system for selective entrapment of benefit agents owing to preferential entrapment and release in response to external stimulus such as sweat, heat or moisture. It is another object of the present invention to provide a delivery system for selective entrapment of benefit agents owing to preferential entrapment and release therefore thereby providing a unique sensorial and/or activity profile to the end consumers.

Further, the selective entrapment also alters release characteristics of the benefit agents which in turn contributes to desirable sensorial impact over a longer time horizon.

In effect, it is one of the objects of the invention to suitably alter the entrapment and release profile of active molecules thereby providing a unique sensorial and/or enhanced active benefit to the end consumer.

SUMMARY OF INVENTION

It is another object of the present invention to provide a delivery system for selective entrapment of benefit agents owing to preferential entrapment and release therefore thereby providing a unique sensorial and/or activity profile to the end consumers.

In an aspect the invention provides a delivery system for selective entrapment of benefit agents, said delivery system:
  a) a solvent system;
  b) 1.5-10% of at least one polymer;
  c) 0.00025-0.75% of at least one enabler; and
  d) optionally at least one benefit agent provided when said benefit agent is present it is different from the enabler.

In another aspect the invention provides a delivery system for benefit agent(s) comprising:
  a) a hydroalcoholic solvent system comprising ethanol in an amount of 90% to 97% weight and water in an amount of 3 to 10%;
  b) 1.5-10% of at least one polymer;
  c) 0.00025-0.75% of at least one enabler; and
  d) 1 wt % to 15 wt % of at least one benefit agent provided said benefit agent is present it is different from the enabler.

BRIEF DESCRIPTION OF FIGURES

FIG. 1. UV-Vis spectra of PVP with different enablers at lower concentration.

FIG. 2. UV-Vis spectra of PVP with different enablers at 10 ppm

FIG. 3—GC HS chromatogram of fragrance components in the presence of BHT and the PVP with water activation.

DESCRIPTION OF THE INVENTION

The terminology used herein is for the purpose of describing particular various embodiments only and is not intended to be limiting of various embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. Also, expressions such as "at least one of," when preceding a list of elements, modify the entire list of elements and do not modify the individual elements of the list.

Described herein is a delivery system for benefit agents and the method of preparation thereof.

In one aspect, there is provided a delivery system comprising:
a) a solvent system;
b) at least one polymer;
c) at least one enabler; and
d) optionally at least one benefit agent provided when said benefit agent is present it is different from the enabler.

In another aspect, there is provided a benefit agent delivery system that comprises:
a) a solvent system;
b) at least one polymer;
c) at least one enabler; and
d) at least one benefit agent provided that the benefit agent is different from the enabler.

The at least one benefit agent that is selectively entrapped in the solvent system has a characteristic logP value of less than 5, preferably less than 4.75.

It has been surprisingly found by the inventors of the present invention that the at least one polymer, as defined in the present invention, in the presence of the at least one enabler lead to preferential entrapment of benefits agents and enhances the retentivity of said select benefit agent in the solvent system. Thereby it further enhances the molecule's solubility inside the solvent system and provides desirable release profile in presence of external stimulus. The benefit agent delivery system enhances retention and controlled delivery of beneficial agents.

Typically, the solvent system is a hydro-alcoholic solvent system comprising alcohol and water. The alcohol is at least one alcohol that is selected from group comprising but not limited to primary, secondary, tertiary $C_1$-$C_5$ alcohol such as ethanol, isopropanol, glycol and the combination thereof. The amount of alcohol in the solvent system is in range from about 90% to 97%. Typically, the amount of water in the solvent system is in the range from 3% to 10%.

Typically, the polymer is polyvinylpyrrolidone (PVP). It is characterized by its molecular weight preferably can be in the range from 25000 to 270000 Daltons. Most preferably the PVP has a molecular weight of 30000 to 270000. Optionally the composition may comprise other natural and synthetic polymers as are commonly known to a person skilled in the art.

Typically, the enabler molecule is an organic compound (s) having a log P value between −1.5 to 6; Said enabler molecules can be selected from the group that includes but is not limited to the following classes of compounds.

Preferably the enabler molecules can be selected from the specific examples as detailed herein below:

Esters—(Aliphatic and aromatic esters like benzoates, acetates, trichloro acetates). The aromatic groups may additionally contain one or more substituents on the ring. Typical substituents include, and are not limited to, hydroxyl groups, ester, ethers, halogens, thiols, thio ester, thio-ethers, amides and derivatives there of. In addition the aromatic groups may be five or six membered rings containing one or more hetero atoms as part of the ring. Typical examples includefurans, thio-furans, azoles, imidazoles.

Ethers (Aliphatic, cyclic and aromatic ethers).—The cyclic and aromatic groups may additionally contain one or more substitutents. Typical substituents include, and are not limited to, hydroxyl groups, ester, ethers, halogens, thiols, thio ester, thio-ethers, amides and derivatives there of. In addition the aromatic groups may be five or six membered rings containing one or more hetero atoms as part of the ring. Typical examples includefurans, thio-furans, azoles, imidazoles.

Polysubstituted aromatic compounds like triclosan, triclocarban having one or more substitutents on the aromatic ring. Typical substituents include, and are not limited to, hydroxyl groups, ester, ethers, halogens, thiols, thio esters, thio-ethers amides and derivatives there of. In addition the aromatic groups may be five or six membered rings containing one or more hetero atoms as part of the ring. Typical examples include, furans, thio-furans, azoles, imidazoles.

Preferred classes of compounds which act as enablers are listed below.

TABLE 1

| S. No | Chemical Class | Examples of different classes of enablers which enhance the fragrance retention using PVP as base | Range of logP Value of each of the ingredients |
|---|---|---|---|
| 1 | Carboxylic acids | Carboxylic acids having the formula RCOOH, wherein R represents $C_1$-$C_{12}$ alkyl, alkenyl, mono-, di- or poly- substituted alkyl, aryl, hetero aryl, allyl, benzyl, alkoxy. | −1.5 to 5.9 |
| 2 | Amines | Amines having the formula $R_1R_2R_3N$, wherein $R_1$ represents H, $C_1$-$C_{12}$ alkyl, alkenyl, mono-, di- or poly- substituted alkyl, aryl, hetero aryl, allyl, benzyl, hydroxyl alkyl, alkoxy; $R_2$ represents H, $C_1$-$C_{12}$ alkyl, alkenyl, mono-, di- or poly- substituted alkyl, aryl, hetero aryl, allyl, benzyl, alkoxy; $R_3$ represents H, $C_1$-$C_{12}$ alkyl, alkenyl, mono-, di- or poly- substituted alkyl, aryl, hetero aryl, allyl, benzyl, alkoxy. | |
| 3 | Esters | Esters having the formula $R_1COOR_2$, wherein $R_1$ represents H, $C_1$-$C_{12}$ alkyl, alkenyl, mono-, di- or poly- substituted alkyl, aryl, hetero aryl, allyl, benzyl, alkoxy; $R_2$ represents H, $C_1$-$C_{12}$ alkyl, alkenyl, mono-, di- or poly- substituted alkyl, aryl, hetero aryl, allyl, benzyl, alkoxy. | |
| 4 | Phenols | Phenols having the formula $C_6R_5OH$ wherein represents H, $C_1$-$C_{12}$ alkyl, alkenyl, mono-, di- or poly- substituted alkyl, aryl, hetero aryl, allyl, benzyl, alkoxy. | |
| 5 | Carbonyl compounds | Aldehydes having the formula $R_1CHO$ wherein $R_1$ represents $C_1$-$C_{12}$ alkyl, alkenyl, mono-, di- or poly-substituted alkyl, aryl, hetero aryl, allyl, benzyl, alkoxy and ketones | |

Most preferred classes of compounds which act as enabler molecules have been listed below.

TABLE 2

| S. No. | Chemical Class | Example ingredient of given class | LogP value with in the given range of −1.5 to 5.9 |
|---|---|---|---|
| 1 | Carboxylic acids | Acetic acid, Propionic acid, Lauric acid | −0.28 0.33 4.6 |

TABLE 2-continued

| S. No. | Chemical Class | Example ingredient of given class | LogP value with in the given range of −1.5 to 5.9 |
|---|---|---|---|
| 2 | Amines | Triethyl amine | 1.64 |
| | | Dodecyl amine | 4.76 |
| | | decyl amine, | 1.92 |
| | | Ethyl amine | 0.037 |
| 3 | Esters | Octyl methoxy cinnamate | 5.8 |
| | | Ethylacetate | 0.71 |
| | | methyl laurate | 5.41 |
| 4 | Phenols | BHT | 5.1 |
| | | p-Cresol | 1.94 |
| | | Triclosan | 4.76 |
| 5 | Carbonyl compounds | Acetone | −0.16 |
| | | Acetophenone | 1.58 |
| | | Benzaldehyde | 1.64 |

The term benefit agent as used in the present invention is defined as "an ingredient that is selectively entrapped by the delivery system of the present invention and has a log P value of less than 5, preferably a log P value of less than 4.75"

Typically, the benefit agent is selected from the group that includes but is not limited to fragrance component, anti-oxidants, humectants, emollients, anti-microbial agents, anti-aging actives, skin-lightening actives, skin conditioning agents, cooling agents, preservatives, sun-screen agent, vita-mins and combinations thereof. In a preferred embodiment the benefit agent can be a fragrance component.

Most often, the benefit agents are mixtures of more than one molecule. It has been found that when more than one molecule is present, the entrapment of the molecules occurs preferentially for those with lower log P values. As the log P values of the carrier molecules goes on increasing, its extent of entrapment would be relatively lower as compared to its counterpart with lower log P Value.

In one of the embodiment of the present invention, the benefit agent is a fragrance molecule. Typically, the benefit agent is characterized by log P values. Preferably, the log P value of the benefit agent that can be entrapped by the delivery system of the present invention is below 4.75, and more preferably the log P value of the benefit agent that can be entrapped by the delivery system of the present invention is below 3. Preferential entrapment of benefit agents below a predetermined threshold of log P values results in change in fragrance profile as well as impact of a formulation comprising the benefit delivery system of the present invention. Small amounts of these enabler molecules present together with polymer, enables the preferred entrapment of benefit agent molecules that have a log P value of less than 4.75 and preferably a log P value of less than 3.

It has been surprisingly found that the presence of enabler molecules, in small amount, significantly impacts the entrap-ment and release profile of benefit agent from the delivery system. Thus in the presence of two or more fragrance molecules, the enabler molecule alters the entrapment pro-file of the polymer such that a select fragrance is entrapped preferentially vis-à-vis another fragrance molecule or other inert molecules present in the composition. Similarly, in the presence of external stimuli such as moisture, pressure, heat, light, the enabler molecules alter the release profile of the fragrance combination such that the first impact of the fragrance is significantly different from fragrance profile perceived by the consumer a little while after application of the composition. While not being bound by theory, one of the probable reasons that may be attributed to this altered profile may be enhanced retentivity of and delayed release of the entrapped fragrance molecule delivered by the delivery system of the present invention onto the animate/in-animate substrate. Since fragrances are often perceived by end con-sumer as a cue of freshness the delivery system of the present invention, in effect provides retention of extended freshness for an extended duration of time. The same has been observed during panel evaluation of products with entrapped fragrance against control.

In another embodiment, the invention provides a unique fragrance complexation technology whereby the end con-sumer perceives one kind of fragrance i.e. 'first impact' during application and a different kind of fragrance after a little while, i.e. 'post application'. The enabler-polymer complex present in the delivery system of the present invention enables such experience to the end consumer.

Fragrance entrapment is an effective technique to deliver the fragrance for a delayed time by entrapping the fragrant active molecules. The inventors of the present invention have observed that concentration of the enabler molecules facilitate a selective entrapment of fragrance component (benefit agent) by the at least one polymer. Thus leading to fragrance retention and dual fragrance bloom/burst; first instant burst upon its delivery and a second one upon exposure to sweat on the substrate.

In another aspect of the present invention, there is pro-vided a benefit agent delivery system comprising, at least one alcohol in an amount of 90% to 97% weight, a fragrance component in an amount of 5-15%, PVP in an amount of 1.5-10%, water in an amount of 3-10% and an enabler molecule in an amount of 0.00025-0.75% wt In yet another aspect of the present invention, there is provided a method for preparation of the benefit agent delivery system comprising the steps of Step 1: preparation of solvent system (ethanol/water) optionally with a benefit agent(s) followed by addition of an enabler(s).

Step 2: Addition of PVP to the solution obtained in step 1 and allowing the solution to equilibrate for 4-5 hours at ambient conditions (25° C.).

In still another aspect of the present invention, there is provided a method for preparation of the fragrance delivery system comprising the steps of Step 1: Addition of fragrance to solvent (ethanol/water) followed by addition of an enabler.

Step 2: Addition of PVP to the solution obtained in step 1 and allowing the solution to equilibrate for 4-5 hours at ambient conditions (25° C.).

In still another specific aspect of the present invention, there is provided a method for preparation of the fragrance delivery system comprising the steps of Step 1: Addition of fragrance to solvent (ethanol/water) followed by addition of BHT.

Step 2: Addition of PVP to the solution obtained in step 1 and allowing the solution to equilibrate for 4-5 hours at ambient conditions (25° C.).

The terms and words used in the following description and claims are not limited to the bibliographical meanings, but, are merely used by the inventor to enable a clear and consistent understanding of the present disclosure. Accord-ingly, it should be apparent to those skilled in the art that the following description of various embodiments of the present disclosure is provided for illustration purpose only and not for the purpose of limiting the present disclosure as defined by the appended claims and their equivalents.

7

EXAMPLES

Example 1

19.8 ml of the solvent (95% v/v ethanol) was taken in a reaction vessel to which ml of BHT solution (1000 ppm in 95% v/v ethanol) was added and homogenized. 100 mg of PVP was finally added to the solution, vortexed until the polymer was solubilized completely. The resulting solution was used for spectrophotometric analysis. Sample without enabler was used as reference. Similarly, delivery system solutions were prepared with other enablers such as acetic acid, acetone, triethanolamine, triclosan.

Analysis of Resulting Solution

Instrument details: Shimadzu UV-2450 UV-visible spectrophotometer The interactions of enablers with PVP was studied by UV-vis spectroscopy by measuring the absorbance at 236 nm for PVP. As represented in FIG. 1 and table 3, higher value of the peak indicate stronger interactions and lower values or negative values indicate weaker interactions.

TABLE 3

| S. No | Enabler evaluated | Concentration(ppm) | Absorbance |
| --- | --- | --- | --- |
| 1 | Acetic acid | 2.7 ppm | −0.124 |
| 2 | Acetone | 2.61 ppm | −0.099 |
| 3 | Triethanolamine | 6.7 ppm | −0.001 |
| 4 | Butylated hydroxy toluene | 10 ppm | 0.155 |
| 5 | Triclosan | 13 ppm | 0.961 |

As seen in Table 3, at lower concentrations acetic acid (2.7 ppm), acetone (2.61 ppm), triethanol amine (6.7 ppm) did not show appreciable interaction at lower.

(Table 1 and FIG. 2). BHT exhibited comparatively lower activities. The lower concentration limit for the enablers is 2 ppm.

TABLE 4

Absorbance value measured at 236 nm for different enablers at 10 ppm concentration.

| S. No | Enabler evaluated | Concentration (ppm) | Absorbance |
| --- | --- | --- | --- |
| 1 | Acetic Acid | 10 ppm | 0.549 |
| 2 | Acetone | 10 ppm | 0.725 |
| 3 | Triethanolamine | 10 ppm | 0.290 |
| 4 | Triclosan | 10 ppm | 0.961 |
| 5 | BHT | 10 ppm | 0.155 |

It can be seen from the Table 4 and the spectrum (FIG. 2) that triclosan, acetone and acetic acid show stronger interaction with PVP compared to BHT and triethanol amine.

Enablers with Higher Log P Value do not Provide the Desired Effect

Cetyl alcohol with a log P value of 7.25 was evaluated as an enabler. No interaction of the enabler with the polymer was observed by UV-vis spectroscopy.

Example 2

A fragrance delivery system was prepared according to the below formulation.

8

| S. No. | Ingredient | Wt/Wt % | Working Range |
| --- | --- | --- | --- |
| 1 | Alcohol | 82.9 | 80-97 |
| 2 | PVP | 5 | 1.5-10 |
| 3 | Fragrance | 8 | 1-15 |
| 4 | Water | 4 | 3-10 |
| 5 | Enabler (BHT) | 0.025 | 0.00025-0.75 |

TABLE 5

Further exemplified compositions which were prepared according to Example 2 (Composition 1-10).

| Exam-ple | Composition | Concentration by weight % | | | | |
| --- | --- | --- | --- | --- | --- | --- |
| | | BHT | Men-thol | Limo-nene | PVP | Sol-vent |
| 1 | Alcohol + BHT | 0.1 | 0 | 0 | 0 | 99.9 |
| 2 | Alcohol + BHT + PVP | 0.1 | 0 | 0 | 5 | 94.9 |
| 3 | Alcohol + Menthol | 0 | 1 | 0 | 0 | 99 |
| 4 | Alcohol + Menthol + PVP | 0 | 1 | 0 | 5 | 94 |
| 5 | Alcohol + Menthol + PVP + BHT | 0.1 | 1 | 0 | 5 | 93.9 |
| 6 | Alcohol + Limonene | 0 | 0 | 1 | 0 | 99 |
| 7 | Alcohol + Limonene + PVP | 0 | 0 | 1 | 5 | 94 |
| 8 | Alcohol + Limonene + PVP + BHT | 0.1 | 0 | 1 | 5 | 93.9 |
| 9 | Alcohol + Menthol + Limonene + BHT | 0.1 | 1 | 1 | 0 | 97.9 |
| 10 | Alcohol + Menthol + Limonene + BHT + PVP | 0.1 | 1 | 1 | 5 | 92.9 |

TABLE 6

GC Head space data for Menthol (having log P value 3.24), Limonene (having log P value 4.57), Geraniol (having log P value 3.28) and Benzyl alcohol (having log P value 1.10) in the presence of PVP*.

| Example | Composition | Geraniol (Head-space area) | Benzyl alcohol (Head-space area) | Menthol (Head-space area) | Limonene (Head-space area) |
| --- | --- | --- | --- | --- | --- |
| 1 | Alcohol + Menthol | — | — | 46069 | — |
| 2 | Alcohol + Menthol + PVP | — | — | 84999 | — |
| 3 | Alcohol + Menthol + PVP + BHT | — | — | 66819 | — |
| 4 | Alcohol + Geraniol | 100259 | — | — | — |
| 5 | Alcohol + Geraniol + PVP + BHT | 0 | — | — | — |
| 6 | Alcohol + Benzyl alcohol | — | 102217 | — | — |
| 7 | Alcohol + Benzylalcohol + PVP + BHT | — | 13417 | — | — |
| 8 | Alcohol + Limonene | — | — | — | 7889939 |
| 9 | Alcohol + Limonene + PVP | — | — | — | 6055373 |
| 10 | Alcohol + Limonene + PVP + BHT | — | — | — | 8562074 |

TABLE 6-continued

GC Head space data for Menthol (having log P value
3.24), Limonene (having log P value 4.57), Geraniol
(having log P value 3.28) and Benzyl alcohol (having
log P value 1.10) in the presence of PVP*.

| Example | Composition | Geraniol (Head-space area) | Benzyl alcohol (Head-space area) | Menthol (Head-space area) | Limonene (Head-space area) |
|---|---|---|---|---|---|
| 11 | Alcohol + Menthol + Limonene + BHT | — | — | 89230 | 7846757 |
| 12 | Alcohol + Menthol + Limonene + BHT + PVP | — | — | 64952 | 9933376 |

*Concentrations of molecules tested: PVP (5%), BHT (0.1%), Geraniol (1%), Benzyl alcohol (1%), Menthol (1%) and Limonene (1%).

Thus as may be seen from table 6, the head space areas of volatile molecules are significantly altered in the presence of PVP and BHT when compared with the control sample. Addition of PVP to the solution of menthol leads to an increase in the headspace area of menthol (entry 2). Surprisingly, addition of BHT (enabler) leads to a decrease in the headspace area of menthol (entry 3). Similar decrease is observed for Geraniol (entry 5) and benzyl alcohol (entry 7). However, the opposite of this behavior is observed with limonene (entries 8-10). Due to favorable interaction between PVP and limonene the head space concentration of limonene is decreased upon addition of PVP. However, in the presence of BHT this interaction is weakened leading to release of more limonene into the headspace.

Similar trend is observed even when both menthol and limonene are present together in solution. Entries 9 and 10 are examples of compositions comprising a combination of active molecules wherein the combination of PVP and BHT preferentially entraps one active molecule (menthol) and leads to a decrease in the head space area of menthol. On the other hand, it leads to an increase in head space area of limonene to the extent that if one were to compare the head space area of limonene (equal concentration added) in entries 8 and 10 there is a significant increase in the initial impact of limonene fragrance which will be perceived from entry 10 as compared to entry 8.

GC-Head Space Studies with Different Enablers

Triclosan, acetic acid and acetone were evaluated for their ability to encapsulate menthol and limonene. All enablers were able to effectively encapsulate menthol. Significant decrease in the GC-Head space area against the control indicates higher levels of encapsulation of menthol by PVP in the presence of enablers.

TABLE 7

Effect of enablers on the encapsulation of Menthol by PVP.

| Example | Enabler | Enabler concentration (%) | GC-HS area (Menthol) | GC-HS area (% of control sample) |
|---|---|---|---|---|
| 1* | — | Nil | 75021 | 100 |
| 2 | BHT | 0.05 | 10608 | 14.14 |
| 3 | | 0.1 | 10773 | 14.36 |
| 4 | | 0.5 | 8798 | 11.73 |
| 5 | Triclosan | 0.05 | 4977 | 6.63 |

TABLE 7-continued

Effect of enablers on the encapsulation of Menthol by PVP.

| Example | Enabler | Enabler concentration (%) | GC-HS area (Menthol) | GC-HS area (% of control sample) |
|---|---|---|---|---|
| 6 | | 0.1 | 3482 | 4.64 |
| 7 | | 0.3 | 6103 | 8.14 |
| 8 | Acetic acid | 0.05 | 708 | 0.94 |
| 9 | | 0.1 | 1030 | 1.37 |
| 10 | | 0.5 | 925 | 1.23 |
| 11 | Acetone | 0.05 | 541 | 0.72 |
| 12 | | 0.1 | 179 | 0.24 |
| 13 | | 0.5 | 199 | 0.27 |

*Control sample without PVP. Solvent adjusted to 100% in all examples described above.

Chromatoraphic Conditions for GC-Head Space:
Column: RXi 5 Sil MS 30 m×0.25 m×0.25 micrometer film thickness.
Oven Program: 50 for 1 min; 10 deg/min to 210 for 2 mins; 10 deg/min to 280 C for 5 mins
Headspace Conditions:
Oven temp—50 C
Sample Line temp—150 C
Transfer line temp—150 C
Equilibration time—10 mins Slit Ratio—10:1
Detector (FID) temp—280 C
Nitrogen—30 ml/min, Air—400 ml/mi Hydrogen 40 ml/min While PVP in the presence of enabler molecules were effective in encapsulation of menthol, they showed a preference for menthol over limonene when used together (Table 8). On the other hand, α-Pinene, with log P value of 4.83, was not encapsulated by PVP in the presence of BHT as enabler. Thus, demonstrating that benefit agents having a log P value of less than 4.75 effectively encapsulated.

TABLE 8

Effect of enablers on the encapsulation of
menthol and limonene combination by PVP.

| Example | Enabler | Enabler concentration (%) | GC-HS area Menthol | GC-HS area Limonene | GC-HS area (% of control sample) Menthol | GC-HS area (% of control sample) Limonene |
|---|---|---|---|---|---|---|
| 1* | — | — | 21157 | 1579809 | 100.00 | 100 |
| 2 | BHT | 0.05 | 4929 | 1813235 | 23.30 | 108.95 |
| 3 | | 0.1 | 6449 | 1866057 | 30.48 | 102.91 |
| 4 | | 0.5 | 12330 | 2020945 | 58.28 | 108.30 |
| 5 | Triclosan | 0.05 | 759 | 1925700 | 3.59 | 95.29 |
| 6 | | 0.1 | 274 | 1916012 | 1.30 | 99.50 |
| 7 | | 0.5 | 841 | 2027488 | 3.98 | 105.82 |
| 8 | Acetic acid | 0.05 | 105 | 1860568 | 0.50 | 91.77 |
| 9 | | 0.1 | 174 | 2096101 | 0.82 | 112.66 |
| 10 | | 0.5 | 399 | 2053175 | 1.89 | 97.95 |
| 11 | Acetone | 0.05 | 220 | 1825472 | 1.04 | 88.91 |
| 12 | | 0.1 | 369 | 1886916 | 1.74 | 103.37 |
| 13 | | 0.5 | 891 | 2004605 | 4.21 | 106.24 |

*Control sample without PVP. Solvent adjusted to 100% in all examples described above.

When menthol and limonene were independently tested significant decrease in headspace area was observed which indicates extent of encapsulation compared to control. In the above table, a combination of menthol and limonene was used and the headspace area was measured to confirm selectivity. If the control is taken as 100, values lower than 100 indicate better encapsulation while the values over and above 100 indicate absence of encapsulation. From these results, it becomes clear that menthol was found to be preferentially encapsulated as against limonene.

It has been found that when more than one molecules, the entrapment of the molecules occurs preferentially for those with lower log P values. As the log P values of the carrier molecules goes on increasing, its extent of entrapment would be relatively lower as compared to its counterpart with lower log P value.

As shown above, when menthol and limonene are used in combination, menthol is selectively entrapped in higher proportions when compared with the amount of limonene that is entrapped. This is because of the fact that log P value of menthol is lower than that of limonene. This helps in selective and preferential entrapment of certain preferred molecules when they are used in combination with other molecules with higher log P values.

Example 3

| S. No. | Ingredient | Wt % |
| --- | --- | --- |
| 1 | Solvent (Ethanol 96% + Water 4%) | 88.9 |
| 2 | Fragrance | 6 |
| 3 | BHT | 0.1 |
| 4 | PVP | 5 |

Process of Preparation:

Step 1: Addition of fragrance to solvent (ethanol/water) followed by addition of an BHT.

Step 2: Addition of PVP to the solution obtained in step 1 and allowing the solution to equilibrate for 4-5 hours at ambient conditions (25° C.).

Analysis

The figure below represents the GC HS chromatogram of fragrance components in the presence of BHT and the PVP with water activation.

The GC HS chromatogram (FIG. 3) shows that the fragrance is release upon water activation. In FIG. 3, X—Represents Fragrance in formulation without polymer Y—Represents Fragrance in formulation with Polymer Z—Represents Fragrance in formulation with Polymer on water activation The different peaks in the chromatogram represent various fragrance components eluting at different retention times. The peak at 13.5 minutes is illustrated for clarity. It is noted that in the formulation above when triggered with water, releases the entrapped fragrance component which is noted with an increase in head space area and hence a higher peak. In the contrary in the absence of a water trigger (Y) the fragrance component remains entrapped.

The inventors have thus, with the use of a simplistic addition of small amount of enabler molecule, been able to derive a solution whereby the fragrance impact from a fragrance composition can be suitably controlled for consumer preference.

The invention claimed is:

1. A delivery system comprising:
   a) a hydro alcoholic solvent system;
   b) 1.5-10% of at least one polymer;
   c) 0.00025-0.75% of at least one enabler; and
   d) optionally, at least one benefit agent;
   wherein when the benefit agent is present, the benefit agent is different from the enabler; and wherein the at least one polymer includes polyvinylpyrrolidone.

2. The delivery system as claimed in claim 1, wherein the alcohol is at least one selected from the group consisting of primary, secondary, and tertiary $C_1$-$C_5$ alcohol.

3. The delivery system as claimed in claim 1, wherein the hydro alcoholic solvent system comprises ethanol in an amount of 90 to 97% weight and water in an amount of 3 to 10 wt %.

4. The delivery system as claimed in claim 1, wherein the amount of the benefit agent when present is in a range from 1 wt % to 15 wt %.

5. The delivery system as claimed in claim 1, wherein the polyvinylpyrrolidone has a weight average molecular weight in a range of 25000 to 270000 Daltons.

6. The delivery system as claimed in claim 1, wherein an enabler of the at least one enabler has a log P value between −1.5 to 6.

7. The delivery system as claimed in claim 1, wherein an enabler of the at least one enabler is selected from carboxylic acids, amines, esters, phenols, and carbonyl compounds.

8. The delivery system as claimed in claim 1, wherein an enabler of the at least one enabler is selected from acetic acid, propionic acid, and lauric acid.

9. The delivery system as claimed in claim 1, wherein an enabler of the at least one enabler is selected from triethyl amine, dodecyl amine, decyl amine, and ethyl amine.

10. The delivery system as claimed in claim 1, wherein an enabler of the at least one enabler is selected from octyl methoxy cinnamate, ethylacetate, and methyl laurate.

11. The delivery system as claimed in claim 1, wherein an enabler of the at least one enabler is selected from BHT, p-Cresol, and triclosan.

12. The delivery system as claimed in claim 1, wherein an enabler of the at least one enabler is selected from acetophenone, benzaldehyde, and acetone.

13. A delivery system comprising:
   a) a hydroalcoholic solvent system comprising ethanol in an amount of 90% to 97% weight and water in an amount of 3 to 10%;
   b) 1.5-10% of at least one polymer;
   c) 0.00025-0.75% of at least one enabler; and
   d) 1 wt % to 15 wt % of at least one benefit agent;
   wherein the benefit agent is different from the enabler; and
   wherein the at least one polymer includes polyvinylpyrrolidone.

14. The delivery system as claimed in claim 13, wherein the benefit agent is selected from a fragrance component, anti-oxidants, humectants, emollients, anti-microbial agents, anti-aging actives, skin-lightening actives, skin conditioning agents, cooling agents, preservatives, sun-screen agents, vitamins, and combinations thereof.

15. The delivery system as claimed in claim 13, wherein the hydro alcoholic solvent system comprises ethanol in an amount of 90 to 97% weight and water in an amount of 3 to 10 wt %.

16. The delivery system as claimed in claim 13, wherein the amount of the benefit agent when present is in a range from 1 wt % to 15 wt %.

17. The delivery system as claimed in claim 13, wherein at the polyvinylpyrrolidone has a weight average molecular weight in a range of 25000 to 270000 Daltons.

18. The delivery system as claimed in claim 13, wherein an enabler of the at least one enabler has a log P value between −1.5 to 6.

19. The delivery system as claimed in claim 13, wherein an enabler of the at least one enabler is selected from carboxylic acids, amines, esters, phenols, and carbonyl compounds.

* * * * *